3,479,434
PHARMACEUTICAL COMPOSITION AND METHOD CONTAINING 5 - METHYL - 5-(4-PYRIDYL)-2-OXIDE-1,3,2-DIOXATHIANE
Winthrop E. Lange, Needham, Mass., assignor to Synergistics, Inc., New York, N.Y., a corporation of New York
No Drawing. Continuation-in-part of application Ser. No. 424,122, Jan. 7, 1965. This application May 16, 1967, Ser. No. 638,761
Int. Cl. A61k 27/00
U.S. Cl. 424—230         17 Claims

ABSTRACT OF THE DISCLOSURE

Pharmaceutical compositions comprising 5-methyl-5-(4-pyridyl)-2-oxide-1,3,2-dioxathiane and its pharmaceutically acceptable salts for use as germicidal agents together with the method for reducing the microbial flora of the skin and as germicidal agents.

---

This application is a continuation-in-part of applicant's co-pending application, Ser. No. 424,122, filed Jan. 7, 1965, now U.S. Patent No. 3,338,912.

This invention relates to new and novel pharmaceutical compositions comprising cyclic sulfite compounds, a method for their preparation as well as a method for their use as germicidal agents. In particular, it relates to pharmaceutical compositions comprising 5-methyl-5-(4-pyridyl)-2-oxide-1,3,2-dioxathiane and its pharmaceutically acceptable salts; a method for the preparation of pharmaceutical compositions containing these compounds and their use as germicidal agents.

While the class of cyclic sulfites have been described in chemical literature, the use of these compounds has been principally as pharmaceutical intermediates, ingredients of plastics and as a means of obtaining amine compounds. The subject compounds of the present invention possess a hitherto unknown and unexpected property of anti-microbial activity, which imparts a special desirability to these agents.

While the literature abounds with descriptions of compounds having antiseptic activity, there is a constant need for new agents capable of counteracting microbial contamination, because of problems inherent to such usage as well as those arising from the biological and physical properties of this class. The broad range of utility for antiseptics which includes such different areas as purification of water and preservation of foods and the disinfection of excreta and contaminated articles of clothing and bedding, to particular applications to public health as the treatment of fungus and bacterial infections and the disinfection of gastsrointestinal and genitourinary tracts as well as wounds, require special agents having particular properties. The particular appplication of antiseptics to a therapeutic regimen is complicated by the consideration of whether they are to be used internally or externally, as well as to toxicity factors which determine the relative amounts which may be absorbed systemically.

It has been found that as a general class, antiseptics, antibacterial agents and germicides, are poorly selective and are therefore injurious to a greater or lesser degree to healthy tissue. With the advent in recent years of the more highly selective, less toxic agents, it was hoped that these compounds would be more suitable for the broader usage than were the older germicidal and antiseptic drugs. However, with the wider and indiscriminate use of such compounds and because of their high degree of antigenicity, agents such as the antibiotics have been found to produce many allergic reactions which seriously reduce their continued use. Sensitivity acquired during the treatment of a minor complaint may seriously handicap the treatment of a later, more severe infection. Still another problem is always present in long-term use of antiseptic and germicidal materials, which is the development of a species resistance to a particular agent, or class of compounds. This resistance in effect neutralizes or renders inert, the antiseptic properties of the compound. Thus, the adaptation phenomenon of bacteria resulting in mutated forms which are resistsant to the antiseptic or antibiotic agent being used requires that a new agent be substituted in order to obtain a continued high degree of antiseptic activity.

It has been found that 5-methyl-5-(4-pyridyl)-2-oxide-1,3,2-dioxathiane, its acid addition salts and the quarternary alkyl halide salts of this compound are potent antiseptic agents. When tested by the conventional agar plate techniques, the compounds exhibited good activity against the broad range of microorganisms which included such strains as Staph. aureus, Pseudomonas aeroginosa, Bacillus subtillus, E. coli, Strep. fecalis, K. Pneumoniae, A. fecalis, P. vulgaris, P. ulvali, C. albicans and M. Audouini.

The new chemical compound, 5-methyl-5-(4-pyridyl)-2-oxide-1,3,2-dioxathiane, is obtained as a white platelet, after the reaction of 2-methyl-2-(4-pyridyl)-1,3-propane diol with thionyl chloride. In the course of this cyclization reaction, a heterocyclic sulfite is formed. The base may be eluted from the acid salt by aqueous alkali and the compound is obtained from chloroform as a white platelet, melting at 104°–105° C. The compound has the empirical formula of $C_9H_{11}NO_3S$ and analyzes in good agreement with the theoretical carbon, hydrogen and nitrogen factors. Its molecular weight is 213.1 and it has the following structural formula:

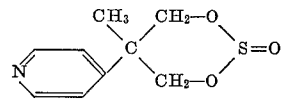

The new compound is slightly soluble in water and ethanol. It is soluble in acetone, benzene and chloroform. The compound is stable under the ordinary conditions of storage.

Acid salts of the base, 5-methyl-5-(4-pyridyl)-2-oxide-1,3,2-dioxathiane are prepared by causing the appropriate acid to react with the base in a neutral medium. By treating the base compound with an alkyl halide in an anhydrous, neutral solvent, the quarternary alkyl halide salt is obtained.

The new compounds may be utilized in the form of solutions, lotions, powders, ointments, shampoos and soaps. Solutions are prepared by dissolving either the base compound, the acid salt, or the quarternary alkyl halide salt in an appropriate pharmaceutically acceptable solvent. The solvent may be either a lipophilic or an alcoholic vehicle, when the base compound is preferred as an antiseptic, or an aqueous, alcoholic, or hydroalcoholic vehicle when the acid salt or the quarternary alkyl halide salt in desired. Solutions of the compound are stable under the usual conditions of storage.

A lotion is prepared by either suspending the base compound in an aqueous or hydroalcoholic solvent or through the emulsification of a base compound in the oil phase of the emulsion vehicle. When the water soluble acid salts are used, then these may be dissolved directly into the aqueous phase of the lotion vehicle.

The new cyclic sulfite compounds may be suspended or dissolved in a shampoo or dispersed in the cleansing preparation, such as a soap to impart germicidal activity to these agents.

Ointments may be prepared by the direct levigation of the active ingredient with the selected ointment base or by emulsifying a solution of the active ingredient into the ointment base. Both hydrophilic and lipophilic ointment bases may be utilized.

When it is desired to utilize these new compounds in the form of a dusting powder, then the preferred compound is mixed with a suitable, pharmaceutically acceptable powder vehicle, as for example, kaolin, starch, talc or mixtures of these.

When the new compounds are utilized in the form of a solution, lotion, ointment, dusting powder, shampoo or soap, the optimal range in concentration of the active ingredient is from 1 percent to 30 percent by weight, although a preferred range of concentration is from 1 to 10 percent by weight. The new componuds provide an effective means of controlling the microbial population of the skin as well as to combat dermatologic infections. Thus, when it is desired to inhibit the growth of microorganisms on the skin and scalp, washing these areas with either a shampoo or soap containing the indicated quantities of the new compounds, an effective inhibition of microorganisms is readily achieved. To combat microbial infection it may be necessary to apply the proper dosage form containing either the base, the acid salt or the alkyl halide salt from 1 to 6 times daily, according to the individual patient needs.

EXAMPLE 1

To a cold, well stirred suspension of 33 gm. of 2-methyl-2-(4-pyridyl) - 1,3 - propanediol in 50 ml. of chloroform, is added 16 ml. of thionyl chloride. After all of the thionyl chloride has been added, the mixture is allowed to warm to room temperature and stirred for an additional 3 hours, or until a clear solution is obtained. The chloroform solution is extracted twice with equal volumes of water. The aqueous fraction is then treated with sodium bicarbonate and sodium hydroxide, until the pH of the solution is pH 11. The aqueous solution assumes a milky appearance with the separation of an oil, which is then extracted with 2 equal portions of chloroform. The chloroform extract is washed with cold water and dried over anhydrous sodium sulfate. The dried chloroform solution is evaporated under vacuum and the residue dissolved in warm benzene. On cooling, the compound 5-methyl-5-(4-pyridyl) - 2 - oxide - 1,3,2-dioxathiane separates as white platelets, which are filtered and dried in a vacuum oven. The new compound melts at 107°–108° C., and has a molecular weight of 213.1. The empirical formula of the new compound is $C_9H_{11}NO_3S$. The compound analyzes in good agreement with the theoretical values for carbon, hydrogen and nitrogen.

*Analysis.*—Theory: C, 50.75%; H, 5.21%; N, 6.58%. Found: C, 50.68%; H, 5.21%; N, 6.79%.

The compound is slightly soluble in water and ethanol but is soluble in chloroform, acetone and benzene.

EXAMPLE 2

In a round bottom, three-neck boiling flask, fitted with a dropping funnel, a mechanical stirrer and a reflux condenser, is added a suspension of 330 gm. of 2-methyl-2-(4-pyridyl)1,3-propanediol in 500 ml. of chloroform. The stirring is started and the suspension chilled to about 0° C., in an ice bath. To the cooled mixture is then added 160 ml. of thionyl chloride in small increments. After all the thionyl chloride has been added, the mixture is stirred for a period of 30 minutes and then removed from the ice-bath. The mixture is then allowed to warm to room temperature, while stirred vigorously and then maintained at room temperature for a period of about 3 hours or until a clear solution is obtained. A 5 percent aqueous solution of sodium carbonate is then added to the chloroform solution, until the pH of the aqueous layer is pH 8.

The aqueous and chloroform layers are separated and the aqueous layer is extracted with 50 ml. of chloroform and the chloroform extract added to the original chloroform portion. The chloroform solutions are extracted once with 50 ml. of water and the chloroform solution drive over anhydrous sodium sulfate. The chloroform is then evaporated and the residue dissolved in anhydrous benzene and set aside to crystallize. The crystalline material is filtered and dried and the product obtained in 5-methyl-5 - (4 - pyridyl) - 2 - oxide-1,3,2-dioxathiane, melting at 107°–108° C. The compound corresponds in every aspect to that obtained as a result of Example 1 above.

EXAMPLE 3

In place of the sodium bicarbonate used in Example 1 and the solution of sodium carbonate used in Example 2, there may be substituted in equimolar proportions a soluble alkaline earth hydroxide, carbonate and bicarbonate, ammonia and ammonium hydroxide solution. The remainder of the steps being the same and the product isolated corresponds in every way to that obtained as a result of Examples 1 and 2.

EXAMPLE 4

Acid addition salts of 5-methyl-5-(4-pyridyl)-2-oxide-1,3,2-dioxathiane may be prepared by reacting the compound with the appropriate acid in an anhydrous neutral medium. To 10 ml. of isopropyl alcohol saturated with hydrogen chloride, is added a solution of 2 grams of 5-methyl-5-(4-pyridyl)-2-oxide-1,3,2 - dioxathiane dissolved in 5 ml. of isopropyl alcohol. The mixture is stirred and allowed to sit at room temperature for a period of 15 to 30 minutes and then chilled in an ice-chest. The hydrochloride salt of 5-methyl-5-(4-pyridyl)-2-oxide-1,3,2 - dioxathiane crystallizes as white crystals, melting at 94°–97° C. The hydrochloric acid salt is soluble in water and insoluble in benzene, ether and chloroform.

EXAMPLE 5

To a solution of 21 grams of 5-methyl-5-(4-pyridyl)-2-oxide-1,3,2-dioxathiane dissolved in 100 ml. of isopropyl alcohol, is added hydrogen chloride gas. The gas is passed through the isopropyl alcohol solution, until the saturation point is reached. On cooling, the hydrochloride salt of 5-methyl-5-(4-pyridyl)-2-oxide - 1,3,2 - dioxathiane separates as a white crystal, which melts at 94°–97° C.

EXAMPLE 6

In place of the hydrogen chloride used in Examples 4 and 5, may be substituted in equimolar proportions, sulfuric acid, hydrogen bromide, nitric acid and phosphoric acid. The corresponding inorganic acid salt is obtained on chilling. When acids such as nitric acid, sulfuric acid and phosphoric acid are used, the concentration of the acid need not exceed 3 times the molar fraction of the base.

EXAMPLE 7

The organic acid salts of the base, 5-methyl-5-(4-pyridyl)-2-oxide-1,3,2-dioxathiane are obtained by reacting the appropriate organic acid with the base compound, in an inert neutral solvent such as alcohol, acetone, chloroform, benzene or dioxane. The organic acid may be either mono-basic, di-basic, or tri-basic and alkyl, aromatic and heretocyclic organic acids may be utilized. In carrying out this synthesis, a slight excess of the organic acid is preferred, although the reaction will proceed with equimolar proportions as well as excess of the base compound. The reagents are separately dissolved in the selected solvent and the acid component is added slowly to the solution of the base compound. The mixture is stirred and warmed to reflux temperature for a period of from 1 to 4 hours, after which time the solvent is removed under vacuum. The residue is dissolved in alcohol and set aside to crystallize. The organic acid salts are obtained as white, solid crystalline substances, with characteristic physical properties, having an acid reaction. The organic acid salts of the base compounds, 5-methyl-5-(4-pyridyl)-2-oxide-1,3,2-dioxathiane, are stable, soluble in water and possess full spectrum of antiseptic activities described for the inorganic acid salts. Such organic acids as formic acid, acetic acid, propionic acid, undecylenic acid, benzoic acid, parahydroxybenzoic acid, salicylic acid, tartaric acid, maleic acid, citric acid, and 2-nitro, 5-carboxy furane, are examples of organic acids which result in the respective organic acid salts of the base compound.

EXAMPLE 8

A solution of 2.1 grams of the base, 5-methyl-5-(4-pyridyl)-2-oxide-1,3,2-dioxathiane dissolved in 25 ml. of anhydrous benzene, is added to a solution of 1.4 grams of methyl iodide dissolved in 10 ml. of anhydrous benzene. The mixture is stirred and then set aside to crystallize. The crystals are filtered, dried and recrystallized from absolute alcohol, to result in a white crystalline compound, melting at 158°–159° C. The compound is the quaternary methyl iodide salt, 1-methyl-4-[5-(2-oxo-5-methyl)-1,3,2-dioxathianyl] pyridinium iodide.

In a similar manner, other alkyl halides may be used in place of the methyl iodide described above, and a corresponding quaternary alkyl halide salt will result. Alkyl halides, such as the chloride bromide and iodide, and having a carbon chain length of from 1 through 3 carbons are preferred, although undecenyl bromide and undecenyl iodide may also be used.

EXAMPLE 9

To a round-bottom, 3-neck boiling flask, fitted with a dropping funnel a mechanical stirrer and a reflux condenser, is added a suspension of 330 gm. of 2-methyl-2-(4-pyridyl)-1,3-propanediol in 500 ml. of chloroform. The stirring is started and the suspension chilled to about 0° C. in an ice-bath. To the cooled mixture, is then added 160 ml. of thionyl chloride in small increments. The mixture is then stirred for a period of at least 30 minutes and removed from the ice-bath and the temperature permitted to rise to room temperature. When the temperature of the mixture has reached room temperature, the excess thionyl chloride and the solvent are removed by distillation. The residue is then dissolved in 500 ml. of distilled water, and the aqueous solution treated with sodium bicarbonate until the pH of the solution is pH 8. The base compound, 5-methyl-5-(4-pyridyl)-2-oxide-1,3,2-dioxathiane separates as a white platelet which is then filtered and dried. The compound thus obtained is in a high state of purity, having a melting point of 107°–108° C.

EXAMPLE 10

When it is desired to control the microbial flora of the surface of the skin, then the active base compound, 5-methyl-5-(4-pyridyl)-2-oxide-1,3,2-dioxathiane, its acid salts or the quaternary alkyl halide salt should be applied to the skin surface from 1 to 6 times daily. While the compounds may be used directly by simply dusting on the surface of the skin, it is preferred to use these active ingredients in combination with a pharmaceutical carrier. The particular pharmaceutical carrier to be selected will depend upon the particular patient needs and may include such vehicles as ointments, lotions and shampoos, soaps and powders, as well as specific carriers such as vegetable oils, water, alcohol and mixtures of these. The concentration of active ingredient may range from 1 percent to 30 percent by weight, with a preferred range in concentration being from 1 percent to 10 percent by weight.

When the preparations are utilized in the form of a shampoo for the control of the bacterial population of the scalp, the preparation is applied to the area, and permitted to remain in contact for 5 minutes before washing.

What is claimed is:

1. An antiseptic composition comprising a therapeutically effective amount of 5-methyl-5-(4-pyridyl)-2-oxide-1,3,2-dioxathiane and a pharmaceutically acceptable carrier.

2. An antiseptic composition comprising a pharmaceutically acceptable carrier and from 1 percent to 30 percent by weight of 5-methyl-5-(4-pyridyl)-2-oxide-1,3,2-dioxathiane.

3. An antiseptic composition comprising a pharmaceutically acceptable carrier and a therapeutically sufficient quantity of a compound having the structure RA, wherein R is 5-methyl-5-(4-pyridyl) - 2 - oxide-1,3,2-dioxathiane and A is an acid selected from the group consisting of hydrochloric acid, sulfuric acid, hydrobromic acid, nitric acid, phosphoric acid, formic acid, acetic acid, propionic acid, undecylenic acid, benzoic acid, parahydroxybenzoic acid, salicylic acid, tartaric acid, maleic acid, citric acid and 2-nitro-5-carboxy furane.

4. An antiseptic composition comprising a pharmaceutically acceptable carrier and from 1 percent to 30 percent by weight of a compound having the structure RA, wherein R is 5-methyl-5-(4-pyridyl)-2-oxide-1,3,2-dioxathiane and A is an acid selected from the group consisting of hydrochloric acid, formic acid, acetic acid, propionic acid, undecylenic acid, benzoic acid, parahydroxybenzoic acid, salicylic acid, tartaric acid, maleic acid, citric acid and 2-nitro-5-carboxy-furane.

5. The antiseptic composition of claim 3, said compound being 5-methyl - 5 - (4-pyridyl)-2-oxide-1,3,2-dioxathiane hydrochloride.

6. The antiseptic composition of claim 3, said compound being 5-methyl - 5 - (4-pyridyl)-2-oxide-1,3,2-dioxathiane sulfate.

7. An antiseptic composition comprising a pharmaceutically acceptable carrier and from 1 percent to 30 percent by weight of the compound 5-methyl-5-(4-pyridyl)-2-oxide-1,3,2-dioxathiane sulfate.

8. An antiseptic composition comprising a pharmaceutically acceptable carrier and from 1 percent to 30 percent by weight of the compound 5-methyl-5-(4-pyridyl)-2-oxide-1,3,2-dioxathiane undecylenate.

9. An antiseptic composition comprising a pharmaceutically acceptable carrier and from 1 percent to 30 percent by weight of the compound 5-methyl-5-(4-pyridyl)-2-oxide-1,3,2-dioxathiane salicylate.

10. An antiseptic composition comprising a pharmaceutically acceptable carrier and from 1 percent to 30 percent by weight of the compound 5-methyl-5-(4-pyridyl)-2-oxide-1,3,2-dioxathiane, 2-nitro-5-carboxyfuranate.

11. An antiseptic composition comprising a pharmaceutically acceptable carrier and a quarternary alkyl halide salt of 5-methyl - 5 - (4-pyridyl)-2-oxide-1,3,2-dioxathiane having the formula 1-alkyl - 4 - [5-(2-oxide-5-methyl) dioxathianyl] pyridinium halide, wherein the said 1-alkyl moiety is selected from the group consisting of methyl, ethyl, propyl, isopropyl and undecenyl groups and the said halide is a halogen selected from the group consisting of chloride, bromide and iodide.

12. An antiseptic composition comprising a pharmaceutically acceptable carrier and a therapeutically effective amount of the compound 1-methyl-4-[5-(2-oxide-5-methyl)-1,3,2-dioxathianyl] pyridinium iodide.

13. An antiseptic composition comprising a pharmaceutically acceptable carrier and from 1 percent to 30 percent by weight of the compound 1-methyl-4-[5-(2-oxide-5-methyl)-1,3,2-dioxathianyl] pyridinium iodide.

14. The method of reducing the microbial flora of the skin which comprises the step of applying an antiseptic amount of 5-methyl - 5 - (4-pyridyl)-2-oxide-1,3,2-dioxathiane to the skin of an animal.

15. The method of reducing the microbial flora of the skin which comprises the step of applying to the skin of an animal an antiseptic amount of a compound having the structure RA, wherein R is 5-methyl-5-(4-pyridyl)-2-oxide-1,3,2-dioxathiane and A is an acid selected from the group consisting of hydrochloric acid, sulfuric acid, hydrobromic acid, nitric acid, phosphoric acid, formic acid, acetic acid, propionic acid, undecylenic acid, benzoic acid, parahydroxybenzoic acid, salicylic acid, tartaric acid, maleic acid, citric acid and 2-nitro-5-carboxy-furane.

16. A method of reducing the microbial flora of the skin which comprises the step of applying to the skin of an animal an antiseptic amount of a pharmaceutical composition comprising a pharmaceutically acceptable carrier and from 1 percent to 30 percent by weight of a compound having the structure RA, wherein R is 5-methyl-5-(4-pyridyl)-2-oxide-1,3,2-dioxathiane and A is an acid selected from the group consisting of hydrochloric acid, sulfuric acid, hydrobromic acid, nitric acid, phosphoric acid, formic acid, acetic acid, propionic acid, undecylenic acid, benzoic acid, parahydroxybenzoic acid, salicylic acid, tartaric acid, maleic acid, citric acid and 2-nitro-5-carboxy-furane.

17. The method of reducing the microbial flora of the skin which comprises the step of applying to the skin of animals an antiseptic amount of a quaternary alkyl halide salt of 5-methyl-5-(4-pyridyl)-2-oxide-1,3,2-dioxathiane having the formula 1-alkyl-4-[5-(2-oxide-5-methyl) dioxathianyl] pyridinium halide, wherein the said 1-alkyl moiety is selected from the group consisting of methyl, ethyl, propyl, isopropyl and undecenyl groups and the said halide is a halogen selected from the group consisting of chloride, bromide and iodide.

References Cited
UNITED STATES PATENTS 3,193,561   7/1965   Addor _____ 424—276 XR
3,025,214   3/1962   Eden _____ 424—276

ALBERT T. MEYERS, Primary Examiner

D. R. MAHANAND, Assistant Examiner

U.S. Cl. X.R.

252—106, 107; 424—69, 168, 263, 357